(12) United States Patent
Preu et al.

(10) Patent No.: US 12,141,334 B2
(45) Date of Patent: Nov. 12, 2024

(54) METHOD FOR INITIALIZING A SECURITY BUS IN A MASTER-SLAVE SYSTEM

(71) Applicant: Robert Bosch GmbH, Stuttgart (DE)

(72) Inventors: Hans-Juergen Preu, Lohr-Sendelbach (DE); Thorsten Klepsch, Erlabrunn (DE)

(73) Assignee: Robert Bosch GmbH, Stuttgart (DE)

( * ) Notice: Subject to any disclaimer, the term of this patent is extended or adjusted under 35 U.S.C. 154(b) by 299 days.

(21) Appl. No.: 17/662,479

(22) Filed: May 9, 2022

(65) Prior Publication Data

US 2022/0358252 A1 Nov. 10, 2022

(30) Foreign Application Priority Data

May 10, 2021 (DE) .................. 10 2021 204 680.0

(51) Int. Cl.
| | | |
|---|---|---|
| *G06F 21/85* | (2013.01) | |
| *G06F 13/362* | (2006.01) | |
| *G06F 13/40* | (2006.01) | |
| *G06F 21/54* | (2013.01) | |
| *G06F 21/55* | (2013.01) | |

(52) U.S. Cl.
CPC ............ *G06F 21/85* (2013.01); *G06F 13/362* (2013.01); *G06F 13/404* (2013.01); *G06F 21/54* (2013.01); *G06F 21/554* (2013.01)

(58) Field of Classification Search
None
See application file for complete search history.

(56) References Cited

U.S. PATENT DOCUMENTS

| | | | | |
|---|---|---|---|---|
| 4,726,017 A | * | 2/1988 | Krum ................ | H04M 11/06 902/39 |
| 2018/0144145 A1 | * | 5/2018 | Pearson ............... | G06F 21/606 |
| 2023/0066634 A1 | * | 3/2023 | Huang ................. | G06F 21/572 |

FOREIGN PATENT DOCUMENTS

EP 2 287 689 A1 2/2011

* cited by examiner

*Primary Examiner* — Farley Abad
*Assistant Examiner* — Dayton Lewis-Taylor
(74) *Attorney, Agent, or Firm* — Maginot, Moore & Beck LLP

(57) ABSTRACT

A method initializes a security bus in a security bus system. The method includes scanning the security bus in order to identify slave units connected to the security bus, and determining, for each identified slave unit, whether the slave unit is a standard slave unit or a slave unit that itself provides input data for the security controller. The method further includes assigning, for each identified slave unit, an address to the slave unit. If the slave unit is a standard slave unit, then the slave unit is automatically assigned a communication address. If the slave unit is a slave unit that itself provides input data for the security controller, then the slave unit is automatically assigned a communication address and additionally a security address. The method also includes storing the addresses assigned to the identified slave units in order to initialize the security bus.

13 Claims, 2 Drawing Sheets

METHOD FOR INITIALIZING A SECURITY BUS IN A MASTER-SLAVE SYSTEM

This application claims priority under 35 U.S.C. § 119 to patent application no. DE 10 2021 204 680.0, filed on May 10, 2021 in Germany, the disclosure of which is incorporated herein by reference in its entirety.

The disclosure relates to a method for initializing a security bus in a master-slave system, the method being able to be used to realize a simple implementation of the security bus.

BACKGROUND

Systems in which a control device or a master unit communicates with one or more sensors, actuators or drives, what are known as slave units, via a communication system, in particular a bus system, are known.

In this case, more and more security functions, for example functions that can be used for personal protection, are realized in such master-slave systems. To this end, the individual slave units each have security modules or control devices, which are designed to execute corresponding security-oriented functions or applications, wherein data which are processed by these modules or control devices are communicated via one or more security buses which are designed separately from a guide communication system via which data for actuating the slave units are generally transmitted. In this case, some of these slave units in turn themselves also transmit input data which are to be processed by a security controller formed in the master unit, wherein the security controller is designed to control the communication via the security bus. The security-oriented function may in this case be a reduction in the speed of a drive or in the corresponding slave unit in response to certain conditions, for example.

The data which are to be processed by way of the security modules of the individual slave units or the security controller formed in the master unit are in this case transmitted cyclically during an operating phase, wherein the operating phase is preceded by an initialization phase or a start-up phase.

Conventional security buses or security bus systems in this case, however, have to be configured in a complicated manner during start-up. In particular, a user has to register all units connected to the security bus and set several communication parameters.

EP 2 287 689 A1 discloses a dynamically addressable slave unit which comprises a bus interface, an enable circuit comprising a switch, and two control terminals which are connected via the switch of the enable circuit. The enable circuit enables the slave unit for the assignment of an address by an addressing signal, provided at the bus interface, only when a control signal is provided at one of the control terminals and when the switch of the enable circuit is open. Otherwise, the enable circuit blocks the slave unit for the assignment of an address. The switch closes depending on a switching signal provided at the bus interface and directed to the address assigned to the slave unit.

The disclosure is therefore based on the object of specifying a method for initializing a security bus in a master-slave system, the method being able to be used to realize a simple implementation of the security bus.

The object is achieved by a method for initializing a security bus in a master-slave system. The object is also achieved by a configurator for initializing a security bus in a master-slave system. The object is further achieved by a master-slave system as disclosed herein.

SUMMARY

According to one embodiment of the disclosure, this object is achieved by a method for initializing a security bus in a master-slave system, wherein the master-slave system comprises a master unit and at least one slave unit, wherein the at least one slave unit is connected to the master unit via a communication system, wherein the communication system has a security bus, wherein the master unit has a security controller, and wherein the at least one slave unit has a security module, wherein the master unit communicates with the at least one slave unit via the security bus in security cycles, wherein the master unit transmits data which are to be processed by way of the security module of the at least one slave unit to the at least one slave unit during a security cycle.

In this case, the method comprises scanning the security bus in order to identify slave units connected to the security bus, determining, for each identified slave unit, whether the slave unit is a standard slave unit or a slave unit that itself provides input data for the security controller, assigning, for each identified slave unit, an address to the slave unit, wherein, if the slave unit is a standard slave unit, the slave unit is automatically assigned a communication address as address, and wherein, if the slave unit is a slave unit that itself provides input data for the security controller, the slave unit is automatically assigned a communication address and additionally a security address as address, and storing the addresses assigned to the identified slave units in order to initialize the security bus.

The security address may in this case be for example address information additionally assigned to the respective slave unit from verification addresses or for example a printed circuit board serial number of the slave unit.

According to the method, a distinction is thus made between two types of slave unit, in particular standard slave units, that is to say slave units which only generally return status signals to the security controller and themselves do not provide input data for the security controller, and slave units that themselves provide input data for the security controller. In this case, a communication address is automatically shared with standard slave units identified during the scanning process such that they only have to be connected to the security bus during start-up, with said slave units subsequently being configured automatically without having to be registered at the security bus. Additional communication parameters have to be set only for slave units that themselves provide input data for the security controller, with most slave units connected to a security bus usually being standard slave units, however. Overall, a method for initializing a security bus in a master-slave system is thus specified, the method being able to be used to realize a simple implementation of the security bus.

The communication address can be formed in this case based on the topological address of the respective slave unit in the communication system.

The topological address corresponds in this case to the physical address of the respective slave unit at the security bus or in the corresponding security bus system.

The communication address can thus be derived easily from the physical address of the respective slave unit without complex calculations or assignments being necessary for this.

In particular, the communication addresses can be derived in this case from sum signals formed by response messages sent to the identified slave units in response to the scanning process.

A sum signal is understood here to mean a signal which assigns each slave unit a number, in particular a number between 1 and the absolute value of the number of total slave units connected to the security bus, with the assignment being bijective. For example, the sum signal can indicate in each case what number slave unit a slave unit is, starting from the master unit. A first slave unit following the master unit in the security bus system thus has the sum signal 1, a second slave unit following the master unit and the first slave unit in the security bus system has the sum signal 2, etc. However, the sum signal may in this case also be independent of the exact order of individual slave units, with the important thing being only that all slave units return a response message.

As a result, each slave unit can be assigned, in a simple manner, an anonymized communication address, that is to say a communication address which does not directly contain the topological address of the respective slave unit and which may be independent of the order of slave units in the security bus system.

Another embodiment of the disclosure is also used to specify a method for verifying data which are to be transmitted from a slave unit to a security controller via a security bus in a master-slave system, wherein the master-slave system comprises a master unit and at least one slave unit, wherein the at least one slave unit is connected to the master unit via a communication system, wherein the communication system has a security bus, wherein the master unit has a security controller, and wherein the at least one slave unit has a security module, wherein the master unit communicates with the at least one slave unit via the security bus in security cycles, wherein the master unit transmits data which are to be processed by way of the security module of the at least one slave unit to the at least one slave unit during a security cycle.

The method in this case comprises initializing the security bus using a method for initializing a security bus in a master-slave system described above, transmitting data which are to be processed by way of the security module of the at least one slave unit to the at least one slave unit during a security cycle, and verifying data contained in a response message which is output by the at least one slave unit in response to the reception of the data which are to be processed by way of the security module of the at least one slave unit, wherein the data contained in the response message are verified based on the corresponding communication address if the at least one slave unit is a standard slave unit, and wherein the data contained in the response message are verified based on the corresponding communication address and the corresponding security address if the at least one slave unit is a slave unit that itself provides input data for the security controller.

According to the method, input data which are transmitted from a slave unit to the security controller are therefore verified based on the communication parameters additionally set for the slave units that themselves provide input data for the security controller or on the additional security address, for example in order to avoid confusing the slave units. In contrast, for the standard slave units, the respective automatically given communication address fully suffices as safeguard, especially since these only generally return status signals to the security controller. Overall, a method which is used to enable verification of data transmitted to the security controller during a cycle operation in a simple manner and without a large degree of outlay is thus specified.

In this case, the step of verifying data contained in a response message which is output by the at least one slave unit in response to the reception of the data which are to be processed by way of the security module of the at least one slave unit if the at least one slave unit is a slave unit that itself provides input data for the security controller can comprise inserting the corresponding assigned security address into the response message, and comparing the security address inserted into the response message with a corresponding stored security address, wherein the input data contained in the response message which is output by the at least one slave unit in response to the reception of the data which are to be processed by way of the security module of the at least one slave unit are graded as trustworthy for the security controller if the security address inserted into the response message matches the corresponding stored security address, and wherein an error message is output if the security address inserted into the response message does not match the corresponding stored security address. The verification of data transmitted to the security controller during a cycle operation can thus be carried out in a simple manner and without a large degree of outlay by looking up communication parameters originally set for the corresponding slave unit or through comparison with data stored in the memory, for example in the form of a look-up table, without complex calculations or assignments being necessary for this.

Another embodiment of the disclosure is also used to specify a configurator for initializing a security bus in a master-slave system, wherein the master-slave system comprises a master unit and at least one slave unit, wherein the at least one slave unit is connected to the master unit via a communication system, wherein the communication system has a security bus, and wherein the at least one slave unit has a security module, wherein the master unit communicates with the at least one slave unit via the security bus in security cycles, wherein the master unit transmits data which are to be processed by way of the security module of the at least one slave unit to the at least one slave unit during a security cycle.

The configurator in this case comprises a scanning unit which is designed to scan the security bus in order to identify slave units connected to the security bus, a determination unit which is designed to determine, for each identified slave unit, whether the slave unit is a standard slave unit or a slave unit that itself provides input data for a security controller, an address assignment unit which is designed to assign an address to each identified slave unit in such a way that, if the slave unit is a standard slave unit, the slave unit is automatically assigned a communication address as address and, if the slave unit is a slave unit that itself provides input data for a security controller, an address assigned to the slave unit comprises an automatically assigned communication address and a security address, and a memory for storing the addresses assigned to the identified slave units.

A configurator for initializing a security bus in a master-slave system which is designed in such a way that simple start-up of the security bus can be realized is therefore specified. In particular, the configurator is designed here to make a distinction between two types of slave unit, in particular standard slave units, that is to say slave units which only generally return status signals to the security controller and themselves do not provide input data for the security controller, and slave units that themselves provide input data for the security controller. In this case, a communication address is automatically shared with standard slave units identified during the scanning process such that they only have to be connected to the security bus during start-up, with said slave units subsequently being configured automatically without having to be registered at the security bus. Additional communication parameters have to be set only for slave units that themselves provide input data for the security controller, with most slave units connected to a security bus usually being standard slave units, however.

In this case, the address assignment unit can be designed to form the communication address based on the topological address of the respective slave unit in the communication system. The address assignment unit can therefore be designed in such a way that the communication address can be derived from the physical address of the respective slave unit in a simple manner, without complex calculations or assignments being necessary for this.

In particular, the address assignment unit can be designed to derive the communication addresses from sum signals formed by response messages sent to the identified slave units in response to the scanning process. The address assignment unit can therefore be designed in such a way as to assign, in a simple manner, an anonymized communication address to each slave unit, that is to say a communication address which does not directly contain the topological address of the respective slave unit and which may be independent of the order of slave units in the security bus system, especially since the only important thing is that all slave units return a response message.

Another embodiment of the disclosure is also used to specify a master-slave system, wherein the master-slave system comprises a master unit and at least one slave unit, wherein the at least one slave unit is connected to the master unit via a communication system, wherein the communication system has a security bus, and wherein the at least one slave unit has a security module, wherein the master unit communicates with the at least one slave unit via the security bus in security cycles, wherein the master unit transmits data which are to be processed by way of the security module of the at least one slave unit to the at least one slave unit during a security cycle. In this case, the master-slave system also has a configurator as described above.

A master-slave system which has a configurator for initializing a security bus in a master-slave system which is designed in such a way that simple start-up of the security bus can be ensured is therefore specified. In particular, the configurator is designed here to make a distinction between two types of slave unit, in particular standard slave units, that is to say slave units which only generally return status signals to the security controller and themselves do not provide input data for the security controller, and slave units that themselves provide input data for the security controller. In this case, a communication address is automatically shared with standard slave units identified during the scanning process such that they only have to be connected to the security bus during start-up, with said slave units subsequently being configured automatically without having to be registered at the security bus. Additional communication parameters have to be set only for slave units that themselves provide input data for the security controller, with most slave units connected to a security bus usually being standard slave units, however.

In this case, the at least one slave unit can be connected to the master unit via the communication system in such a way that a closed communication ring is formed, that is to say the master unit and the at least one slave unit are interconnected in a ring shape. Closed communication rings of this type have the advantage that for example breaks in the communication ring can be located and closed automatically. Furthermore, each slave unit can be addressed in a simple manner based on its position in the communication ring, such that the initialization of the master-slave system can be simplified even further.

In addition, the master-slave system can have a plurality of slave units, wherein a sum frame message of the master unit contains data for a multiplicity of slave units.

This means that a data message provided on the security bus can be received by a plurality of or preferably each slave unit connected to the security bus in turn. In this case, a slave unit can draw the data packet segments or input data assigned thereto in the data message and insert its output data into the data message as data packet segments. Each slave unit forwards the data message modified in this way to each subsequent slave unit, with all slave units usually proceeding in the same way. The last slave unit can in this case return the data message to the master unit if there is a closed communication ring or to the previous slave unit in the case of a stringed bus architecture, that is to say a bus architecture which is not closed in a ring shape.

Sum frame messages of this kind can cause, among other things, corresponding message transmissions not having to be repeated in the event of a fault.

In one embodiment, the master-slave system also has a verification unit which is designed to verify data contained in a response message which is output by the at least one slave unit in response to the reception of the data which are to be processed by way of the security module of the at least one slave unit, wherein the verification unit is designed to verify data contained in the response message based on the corresponding communication address if the at least one slave unit is a standard slave unit, and to verify data contained in the response message based on the corresponding communication address and the corresponding security address if the at least one slave unit is a slave unit that itself provides input data for the security controller. The verification unit is therefore designed in such a way that input data transmitted from a slave unit to the security controller are verified based on the communication parameters additionally set for the slave units that themselves provide input data for the security controller or on the additional security address, for example in order to avoid confusing the slave units. In contrast, for the standard slave units, the respective automatically given communication address fully suffices as safeguard, especially since these only generally return status signals to the security controller. Overall, a verification of data transmitted to the security controller during a cycle operation is thus made possible in a simple manner and without a large degree of outlay.

In this case, the verification unit can have an insertion unit which is designed to insert the corresponding assigned security address into the response message if the at least one slave unit is a slave unit that itself provides input data for the security controller, a comparator which is designed to compare the security address inserted into the response message with a corresponding stored security address, and an assessment unit which is designed to grade the input data contained in the response message which is output by the at least one slave unit in response to the reception of the data which are to be processed by way of the security module of the at least one slave unit as trustworthy for the security controller if the security address inserted into the response message matches the corresponding stored security address, and to output an error message if the security address inserted into the response message does not match the corresponding stored security address. The verification unit can thus be designed, in particular, in such a way that a verification of data transmitted to the security controller during a cycle operation can be carried out in a simple manner and without a large degree of outlay by looking up the communication parameters originally set for the corresponding slave unit or through comparison with data stored in the memory, for example in the form of a look-up table, without complex calculations or assignments being necessary for this.

In summary, it can be stated that the disclosure is used to specify a method for initializing a security bus in a master-slave system, the method being able to be used to realize a simple start-up of the security bus.

According to the method, a distinction is made here between two types of slave unit, in particular standard slave units, that is to say slave units which only generally return status signals to the security controller and themselves do not provide input data for the security controller, and slave units that themselves provide input data for the security controller. In this case, a communication address is automatically shared with standard slave units identified during the scanning process such that they only have to be connected to the security bus during start-up, with said slave units subsequently being configured automatically without having to be registered at the security bus. Additional communication parameters have to be set only for slave units that themselves provide input data for the security controller, with most slave units connected to a security bus usually being standard slave units, however.

Subsequently, input data which are to be transmitted via a security bus in a master-slave system from a slave unit to a security controller can be verified in a simple manner during an operating phase based on the correspondingly configured slave units.

The configurations and developments described can be combined with one another as desired.

Further possible configurations, developments and implementations of the disclosure also include combinations, which have not been explicitly mentioned, of features of the disclosure described above or below in relation to the exemplary embodiments.

BRIEF DESCRIPTION OF THE DRAWINGS

The appended drawings are intended to impart further understanding of the embodiments of the disclosure. They illustrate embodiments and, in conjunction with the description, serve to explain principles and concepts of the disclosure.

Other embodiments and many of the mentioned advantages result with regard to the drawings. The illustrated elements of the drawings are not necessarily shown to scale with respect to one another.

In the drawings:

FIG. 1 shows a block diagram of a master-slave system according to embodiments of the disclosure;

FIG. 2 shows a flowchart of a method for initializing a security bus in a master-slave system according to embodiments of the disclosure; and FIG. 3 shows a flowchart of a method for verifying data which are to be transmitted from a slave unit to a security controller via a security bus in a master-slave system.

DETAILED DESCRIPTION

In the figures of the drawings, identical reference signs denote identical or functionally identical elements, parts or components, unless indicated to the contrary.

Figure 1:
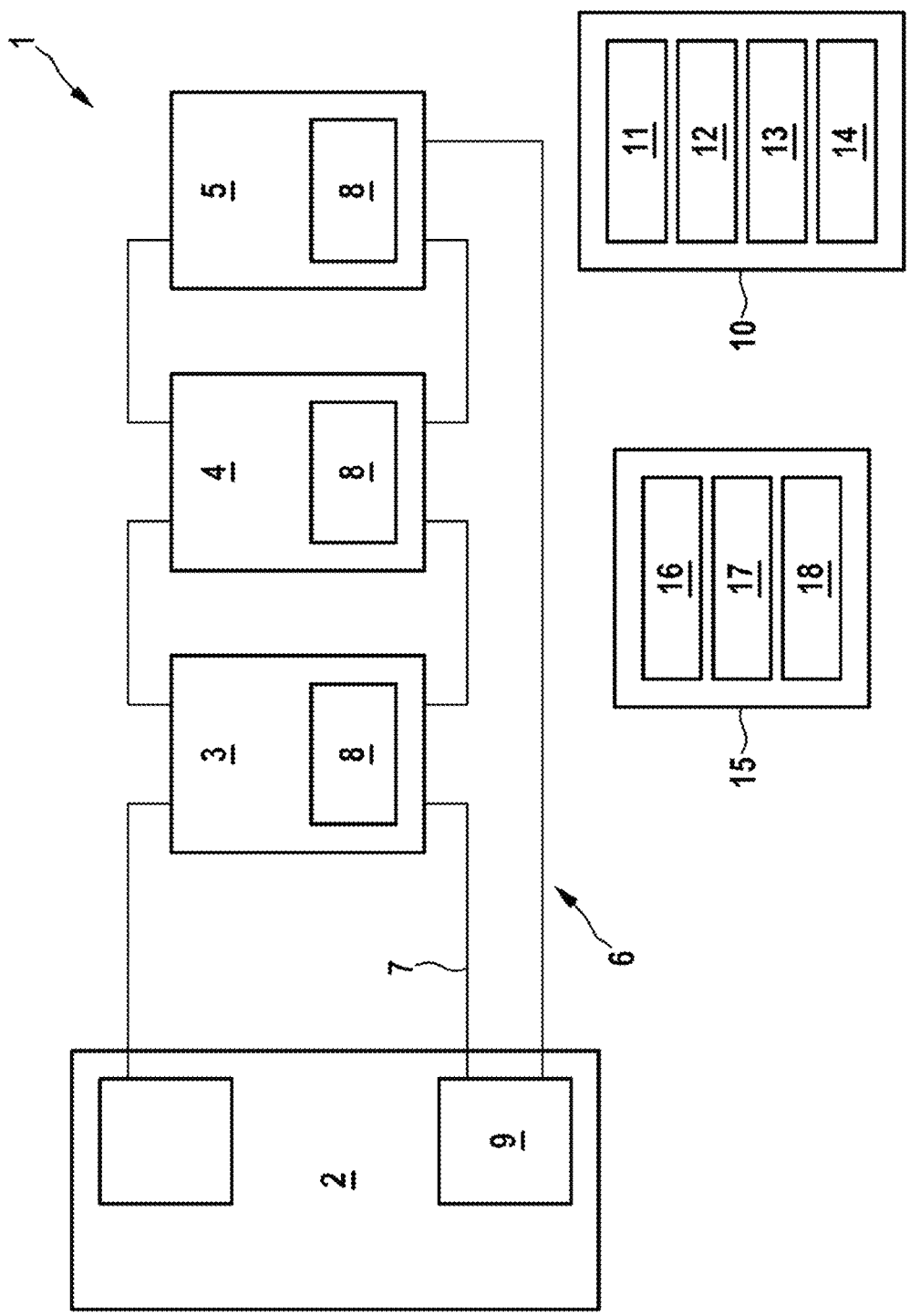

FIG. 1 shows a block diagram of a master-slave system 1 according to embodiments of the disclosure.

Systems in which a control device or a master unit communicates with one or more sensors, actuators or drives, what are known as slave units, via a communication system, in particular a bus system, are known.

In this case, more and more security functions, for example functions that can be used for personal protection, are realized in such master-slave systems. To this end, the individual slave units each have security modules or control devices, which are designed to execute corresponding security-oriented functions or applications, wherein data which are processed by these modules or control devices are communicated via one or more security buses which are designed separately from a guide communication system via which data for actuating the slave units are generally transmitted. In this case, some of these slave units in turn themselves also transmit input data which are to be processed by a security controller formed in the master unit, wherein the security controller is designed to control the communication via the security bus. The security-oriented function may in this case be a reduction in the speed of a drive or in the corresponding slave unit in response to certain conditions, for example.

The data exchange is usually carried out here via data messages.

The data which are to be processed by way of the security modules of the individual slave units are in this case further transmitted cyclically during an operating phase, with the operating phase being preceded by an initialization phase or a start-up operation.

Conventional security buses or security bus systems in this case have to be configured in a complicated manner during start-up. In particular, a user has to register all units connected to the security bus and set several communication parameters.

As FIG. 1 shows, the master-slave system 1 in this case has one master unit 2 and three slave units 3, 4, 5, wherein the slave units 3, 4, 5 are connected to the master unit 2 via a communication system 6, wherein the communication system 6 has a security bus 7, and wherein the slave units 3, 4, 5 each have a security module 8, wherein the master unit 2 communicates with the slave units 3, 4, 5 via the security bus 7 in security cycles, wherein the master unit 2 transmits data which are to be processed in each case by way of the security module 8 of the slave unit 3, 4, 5 to the individual slave units 3, 4, 5 during a security cycle.

In this case, a security controller 9 is formed in the master unit 2, the security controller forming the actual communication master in a corresponding security bus system which is formed by the security controller 9 and the slave units 3, 4, 5 as security subscribers.

The data which are to be processed by way of the security modules 8 of the individual slave units 3, 4, 5 are in this case transmitted cyclically during an operating phase, with the operating phase being preceded by an initialization phase.

As FIG. 1 shows, the master-slave system 1 in this case also comprises a configurator 10, wherein the configurator 10 comprises a scanning unit 11 which is designed to scan the security bus 7 in order to identify slave units 3, 4, 5 connected to the security bus 7, a determination unit 12 which is designed to determine, for each identified slave unit 3, 4, 5, whether the slave unit 3, 4, 5 is a standard slave unit or a slave unit that itself provides input data for the security controller 9, an address assignment unit 13 which is designed to assign an address to each identified slave unit in such a way that, if the slave unit is a standard slave unit, the slave unit is automatically assigned a communication address as address and, if the slave unit is a slave unit that itself provides input data for the security controller 9, the slave unit is automatically assigned a communication address and additionally a security address as address, and a memory 14 for storing the addresses assigned to the identified slave units.

The master-slave system 1 therefore has a configurator 10 for initializing the security bus 7 in the master-slave system 1 which is designed in such a way that a simple start-up of the security bus 7 can be realized. In particular, the configurator 10 is designed in this case to make a distinction between two types of slave unit, in particular standard slave units, that is to say slave units which only generally return status signals to the security controller and themselves do not provide input data for the security controller, and slave units that themselves provide input data for the security controller 9. In this case, a communication address is automatically shared with standard slave units identified during the scanning process such that they only have to be connected to the security bus 7 during start-up, with said slave units subsequently being configured automatically without having to be registered at the security bus 7. Additional communication parameters have to be set only for slave units that themselves provide input data for the security controller 9, with most slave units connected to a security bus usually being standard slave units, however.

An anonymously given communication address thus usually suffices for standard slave units of this type, whereas an additional safeguard is necessary for slave units that themselves provide input data for the security controller 9 in order to avoid confusing slave units in the security controller 9 and thus associated security risks.

The security address may in this case be for example address information additionally assigned to the respective slave unit from verification addresses or for example a printed circuit board serial number of the slave unit.

The scanning unit, the determination unit and the address assignment unit can each be realized in this case for example by corresponding code which can be executed by a processor. The memory can also, in particular, be integrated into the security controller and, in particular, into a function block within the security controller.

According to the embodiments of FIG. 1, the address assignment unit 13 is also configured to form the communication address based on the topological address of the respective slave unit in the communication system.

In particular, the address assignment unit 13 is designed in this case to derive the communication addresses from sum signals formed by response messages sent to the identified slave units in response to the scanning process. Such sum signals, for example formed from general status signals, thus suffice for standard slave units in order to locate or to verify same.

According to the embodiments of FIG. 1, the slave units 3, 4, 5 are also connected to the master unit 2 by the communication system 6 in such a way that a closed communication ring is formed. As can be seen, in this case the security bus system forms, in particular, a closed communication ring.

According to the embodiments of FIG. 1, a sum frame message of the master unit 2 also contains data for a multiplicity of slave units, with the sum frame message according to the embodiments of FIG. 1 containing data for all slave units 3, 4, 5.

The master-slave system 1 illustrated also has a verification unit 15 which is designed to verify data contained in a response message which is output by one of the slave units 3, 4, 5 in response to the reception of the data which are to be processed by way of the security module of the at least one slave unit, wherein the verification unit 15 is designed to verify data contained in the response message based on the corresponding communication address if the at least one slave unit is a standard slave unit, and to verify data contained in the response message based on the corresponding communication address and the corresponding security address if the at least one slave unit is a slave unit that itself provides input data for the security controller.

The verification unit 15 is therefore designed in such a way that input data transmitted from a slave unit 3, 4, 5 to the security controller 9 are verified based on the communication parameters additionally set for the slave units that themselves provide input data for the security controller or on the additional security address, for example in order to avoid confusing the slave units. In contrast, for the standard slave units, the respective automatically given communication address fully suffices as safeguard, especially since these only generally return status signals to the security controller. Overall, a verification of data transmitted to the security controller during a cycle operation is thus made possible in a simple manner and without a large degree of outlay.

The verification unit can in this case be realized in turn for example by corresponding code which can be executed by a processor, with the checking unit preferably being formed or integrated into the security controller.

According to the embodiments of FIG. 1, the verification unit 15 in this case has an insertion unit 16 which is designed to insert the corresponding assigned security address into the response message if the at least one slave unit is a slave unit that itself provides input data for the security controller, a comparator 17 which is designed to compare the security address inserted into the response message with a corresponding stored security address, and an assessment unit 18 which is designed to grade the input data contained in the response message which is output by the at least one slave unit in response to the reception of the data which are to be processed by way of the security module of the at least one slave unit as trustworthy for the security controller if the security address inserted into the response message matches the corresponding stored security address, and to output an error message if the security address inserted into the response message does not match the corresponding stored security address.

Figure 2:
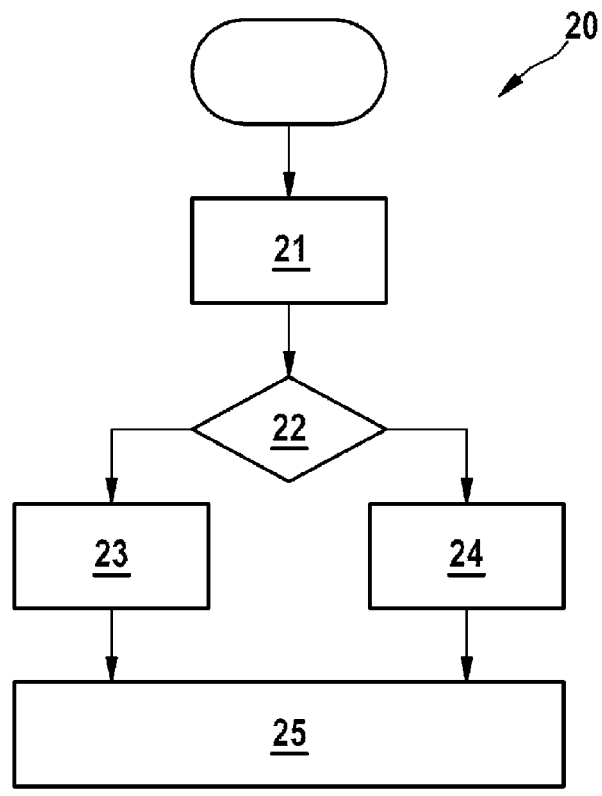

FIG. 2 shows a flowchart of a method 20 for initializing a security bus in a master-slave system according to embodiments of the disclosure.

The master system in turn comprises a master unit and at least one slave unit, wherein the at least one slave unit is connected to the master unit via a communication system, wherein the communication system has a security bus, wherein the master unit has a security controller, and wherein the at least one slave unit has a security module, wherein the master unit communicates with the at least one slave unit via the security bus in security cycles, wherein the master unit transmits data which are to be processed by way of the security module of the at least one slave unit to the at least one slave unit during a security cycle.

As FIG. 2 shows, the method in this case comprises a step 21 of scanning the security bus in order to identify slave units connected to the security bus and a step 22 of determining, for each identified slave unit, whether the slave unit is a standard slave unit or a slave unit that itself provides input data for the security controller.

If it is determined in step 22 that the slave unit is a standard slave unit, the slave unit is subsequently automatically assigned a communication address as address in step 23.

In contrast, if it is determined in step 22 that the slave unit is a slave unit that itself provides input data for the security controller, the slave unit is subsequently assigned an address in step 24 in such a way that the assigned address comprises an automatically assigned communication address and a security address.

In a step 25, the addresses assigned to the identified slave units are subsequently stored in order to initialize the security bus.

According to the embodiments of FIG. 2, the communication address is in turn formed here based on the topological address of the respective slave unit in the communication system.

In particular, the communication addresses are derived here from sum signals formed by response messages sent to the identified slave units in response to the scanning process.

Figure 3:
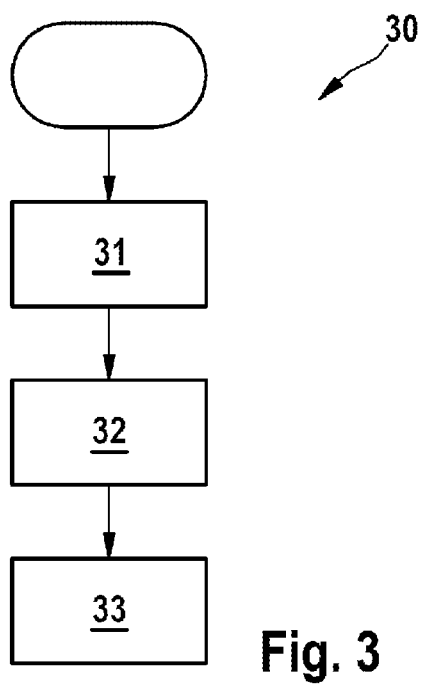

FIG. 3 shows a flowchart of a method 30 for verifying input data which are to be transmitted from a slave unit to a security controller via a security bus in a master-slave system.

In this case, the master system in turn comprises a master unit and at least one slave unit, wherein the at least one slave unit is connected to the master unit via a communication system, wherein the communication system has a security bus, wherein the master unit has a security controller, and wherein the at least one slave unit has a security module, wherein the master unit communicates with the at least one slave unit via the security bus in security cycles, wherein the master unit transmits data which are to be processed by way of the security module of the at least one slave unit to the at least one slave unit during a security cycle.

As FIG. 3 shows, the method comprises in this case a step 31 of initializing the security bus using an above-described method for initializing a security bus in a master-slave system, a step 32 of transmitting data which are to be processed by way of the security module of the at least one slave unit to the at least one slave unit during a security cycle, and a step 33 of verifying data contained in a response message which is output by the at least one slave unit in response to the reception of the data which are to be processed by way of the security module of the at least one slave unit, wherein the data contained in the response message are verified based on the corresponding communication address if the at least one slave unit is a standard slave unit, and wherein the data contained in the response message are verified based on the corresponding communication address and the corresponding security address if the at least one slave unit is a slave unit that itself provides input data for the security controller.

According to the embodiments of FIG. 3, the step 33 of checking data contained in a response message which is output by the at least one slave unit in response to the reception of the data which are to be processed by way of the security module of the at least one slave unit if the at least one slave unit is a slave unit that itself provides input data for the security controller comprises inserting the corresponding assigned security address into the response message, and comparing the security address inserted into the response message with a corresponding stored security address, wherein the input data contained in the response message which is output by the at least one slave unit in response to the reception of the data which are to be processed by way of the security module of the at least one slave unit are graded as trustworthy for the security controller if the security address inserted into the response message matches the corresponding stored security address, and wherein an error message is output if the security address inserted into the response message does not match the corresponding stored security address.

What is claimed is:

1. A method for initializing a security bus in a master-slave system, the master-slave system comprising a master unit and at least one slave unit, the at least one slave unit is connected to the master unit via a communication system, the communication system has the security bus, the master unit has a security controller, and the at least one slave unit has a security module, the method comprising:
   using the master unit to communicate with the at least one slave unit via the security bus in security cycles;
   transmitting data using the master unit to the at least one slave unit during one of the security cycles, the transmitted data are configured to be processed by way of the security module of the at least one slave unit;
   scanning the security bus in order to identify the at least one slave unit connected to the security bus;
   determining, for each identified at least one slave unit, whether the identified at least one slave unit is a first slave unit that itself provides input data for the security controller;
   assigning, for each identified at least one slave unit, an address to the slave unit, when the identified at least one slave unit is the first slave unit, the identified at least one slave unit is automatically assigned a communication address as the address, and when the identified at least one slave unit is the slave unit that itself provides input data for the security controller, the identified at least one slave unit is automatically assigned a communication address and additionally a security address as the address; and
   storing the addresses assigned to the identified at least one slave unit in order to initialize the security bus.

2. The method according to claim 1, wherein the communication address is formed based on a topological address of the respective slave unit in the communication system.

3. The method according to claim 1, wherein the communication addresses are derived from sum signals formed by response messages sent to the identified at least one slave unit in response to the scanning of the security bus.

4. The method according to claim 1, further comprising:
   verifying data contained in a response message which is output by the identified at least one slave unit in response to reception of the data which are to be processed by way of the security module of the at least one slave unit,
   wherein the data contained in the response message are verified based on the corresponding communication address when the identified at least one slave unit is the first slave unit, and
   wherein the data contained in the response message are verified based on the corresponding communication address and the corresponding security address when the identified at least one slave unit is the slave unit that itself provides input data for the security controller.

5. The method according to claim 4, wherein verifying the data when the identified at least one slave unit is the slave unit that itself provides input data for the security controller comprises:
   inserting the corresponding assigned security address into the response message; and comparing the security address inserted into the response message with a corresponding stored security address, wherein the input data contained in the response message which is output by the identified at least one slave unit in response to the reception of the data which are to be processed by way of the security module of the at least one slave unit are graded as trustworthy for the security controller when the security address inserted into the response message matches the corresponding stored security address, and wherein an error message is output when the security address inserted into the response message does not match the corresponding stored security address.

6. A configurator for initializing a security bus in a master-slave system, the master-slave system comprises a master unit and at least one slave unit, the at least one slave unit connected to the master unit via a communication system, the communication system comprises the security bus, the master unit has a security controller, the at least one slave unit has a security module, the master unit communicates with the at least one slave unit via the security bus in security cycles, the master unit transmits data which are to be processed by way of the security module of the at least one slave unit to the at least one slave unit during a security cycle, the configurator comprising:

a processor configured to:
scan the security bus in order to identify slave units connected to the security bus;
determine, for each identified slave unit, whether the identified slave unit is a first slave unit that itself provides input data for a security controller; and
assign an address to each identified slave unit in such a way that, when the identified slave unit is the first slave unit, the identified slave unit is automatically assigned a communication address as the address and, when the identified slave unit is the slave unit that itself provides input data for the security controller, an address assigned to the identified slave unit comprises an automatically assigned communication address and a security address; and
a non-transitory memory configured to store the addresses assigned to the identified slave units.

7. The configurator according to claim 6, wherein the processor is further configured to form the communication address based on a topological address of the respective slave unit in the communication system.

8. The configurator according to claim 7, wherein the processor is further configured to derive the communication addresses from sum signals formed by response messages sent to the identified slave units in response to the scanning of the scanning unit.

9. A master-slave system, comprising:
a communication system including a security bus;
a master unit including a security controller;
at least one slave unit connected to the master unit via the communication system, the at least one slave unit including a security module; and
a processor configured to initialize the security bus, the processor including being further configured to:
scan the security bus in order to identify the at least one slave unit connected to the security bus;
determine, for each identified slave unit, whether the identified slave unit is a first slave unit that itself provides input data for the security controller; and
assign an address to each identified slave unit in such a way that, when the identified slave unit is the first slave unit, the identified slave unit is automatically assigned a communication address as the address and, when the identified slave unit is the slave unit that itself provides input data for the security controller, an address assigned to the identified slave unit comprises an automatically assigned communication address and a security address; and
a non-transitory memory configured to store the addresses assigned to the identified slave units,
wherein the master unit is configured to communicate with the at least one slave unit via the security bus in security cycles, and
wherein the master unit transmits data which are to be processed by way of the security module of the at least one slave unit to the at least one slave unit during one of the security cycles.

10. The master-slave system according to claim 9, wherein the at least one slave unit is connected to the master unit via the communication system in such a way that a closed communication ring is formed.

11. The master-slave system according to claim 9, wherein:
the at least one slave unit includes a plurality of the slave units, and
a sum frame message of the master unit contains data for the plurality of the slave units.

12. The master-slave system according to claim 9, wherein:
the processor is further configured to verify data contained in a response message which is output by one of the identified slave units in response to the reception of the data which are to be processed by way of the security module of the at least one slave unit,
the processor is further configured to verify data contained in the response message based on the corresponding communication address when the identified slave unit is the first slave unit, and
the processor is further configured to verify data contained in the response message based on the corresponding communication address and the corresponding security address when the identified slave unit is the slave unit that itself provides input data for the security controller.

13. The master-slave system according to claim 12, wherein:
the processor is further configured to:
insert the corresponding assigned security address into the response message when the identified slave unit is the slave unit that itself provides input data for the security controller,
compare the security address inserted into the response message with a corresponding stored security address, and
grade the input data contained in the response message which is output by the identified slave unit in response to the reception of the data which are to be processed by way of the security module of the identified slave unit as trustworthy for the security controller when the security address inserted into the response message matches the corresponding stored security address, and to output an error message when the security address inserted into the response message does not match the corresponding stored security address.

* * * * *